United States Patent

[11] 3,555,174

[72] Inventor Walter Bruch
Hannover, Germany
[21] Appl. No. 679,361
[22] Filed Oct. 31, 1967
[45] Patented Jan. 12, 1971
[73] Assignee Telefunken Patentverwertungsgesellschaft m.b.H.
Ulm (Danube), Germany
[32] Priority Dec. 3, 1966
[33] Germany
[31] No. T32667

[54] SYNCHRONIZING CIRCUIT FOR SECAM SWITCH
5 Claims, 3 Drawing Figs.

[52] U.S. Cl. .......... 178/5.4
[51] Int. Cl. .......... H04n 9/40
[50] Field of Search .......... 178/5.1, 5.4S, 5.4

[56] References Cited
UNITED STATES PATENTS

| | | | |
|---|---|---|---|
| 2,993,086 | 7/1961 | de France | 178/5.4(S) |
| 3,267,208 | 8/1966 | Brouard | 178/5.4(S) |
| 3,336,437 | 8/1967 | Brouard et al. | 178/5.4(S) |

*Primary Examiner*—Robert L. Griffin
*Assistant Examiner*—Richard P. Lange
*Attorney*—Spencer & Kaye

ABSTRACT: The present invention relates to a color television receiver according to the SECAM principle, and to a circuit for synchronizing a line frequency switch in such a receiver. The synchronizing voltage is derived from the color carrier gated during the horizontal retrace. The mean frequency of the carrier is changed from line to line. The gated color carrier is passed to a frequency dependent circuit, e.g. a frequency discriminator or a resonant circuit tuned to one of the mean carrier frequencies. At the output terminals of the frequency dependent circuit there is delivered a voltage with half the line frequency which voltage is used for synchronizing the line frequency switch.

Inventor:
Walter Bruch
By: Spencer & Kaye
Attorneys

Inventor:
Walter Bruch
By: Spencer & Kaye
Attorneys

SYNCHRONIZING CIRCUIT FOR SECAM SWITCH

The invention relates to a color television receiver adapted to receive a SECAM-type color television signal.

In the well known SECAM-type color television system two color signals are transmitted alternately in line sequence by a carrier frequency modulated by said color signals. For synchronizing the line frequency switch that is needed in such a receiver, in the vertical blanking period an identification signal is transmitted which during the vertical blanking period in the receiver ensures the correct switching phase of the line frequency switch. This solution has the drawback that in the receiver, gating is necessary during the vertical flyback time in order to separate the identification signal from the complete signal. Endeavours are moreover made to keep the vertical blanking period free for test signals, so that the transmission of a identification signal in this period is undesired. The deriving of the characteristic signal from the vertical blanking period moreover has drawbacks in the case of magnetic tape recording because the change of head takes place here generally during the vertical blanking out time.

SUMMARY OF THE INVENTION

It is an object of the invention to simplify in a receiver for the system of the aforementioned type the synchronizing of the line frequency switch, making it possible to dispense with the special identification signal in the vertical blanking period as heretofore used.

The invention is based on the fact, that with SECAM III*b* (or SECAM III opt) the specifications for which are described in Documents C.C.I.R. Study Group, Doc. XI/ 164-E, June 23, 1966, the frequency modulated carrier has a zero frequency with a different value in the two consecutive lines in the event of an uncolored picture. This occurs if the color difference signals have the value zero, for instance for black. During a portion of the horizontal blanking period of the received signal the carrier is not blanked out. During these portions the carrier is transmitted therefore, with a zero frequency which is related to the line in question.

Briefly stated and in accordance with certain aspects of this invention there is provided in a color television receiver adapted to receive a color television signal including two color signals alternately transmitted by the frequency modulation of a carrier whose mean frequency is changed from line to line between two different values, a gate separating the carrier from the color television signal during the horizontal blanking period and delivering bursts of carrier frequency the frequency of which changes from the blanking period of one line to the blanking period of the following line, a frequency dependent circuit fed with said bursts and delivering a voltage depending on the frequency deviations, filter means for filtering from said voltage a voltage of half line frequency, and a line frequency switch synchronized by said voltage of half line frequency.

BRIEF DESCRIPTION OF THE DRAWINGS

The specification concludes with claims particularly pointing out and distinctly claiming the subject matter which is regarded as the invention. The invention may also be understood from the following description taken in connection with the accompanying drawings in which:

DESCRIPTION OF THE PREFERRED EMBODIMENTS

Figure 1:
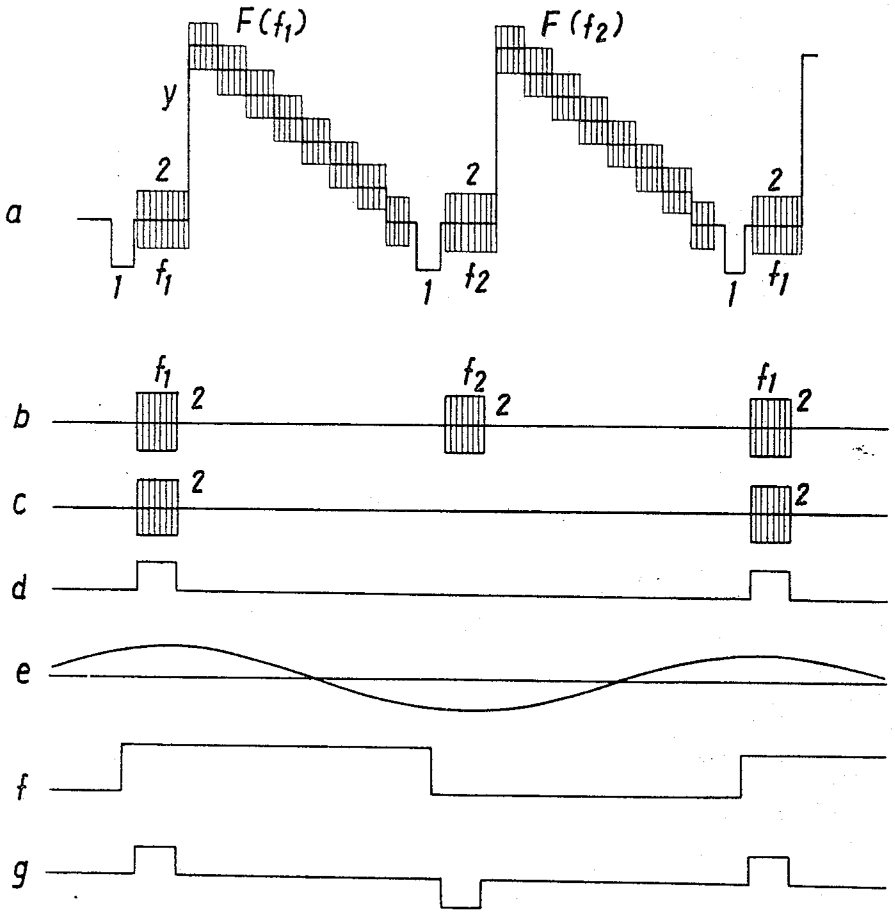
FIG. 1 shows the FBAS color video signal forming the basis of the invention and curves for explaining the method of operation of the invention.

The FBAS color video signal shown in FIG. 1*a* consists of horizontal synchronizing pulses 1, bursts 2 of carrier frequency, a luminance signal Y and a frequency modulated color carrier F superimposed on the latter. The frequency of the color carrier F and the bursts can be switched over from line to line between two values $f1$ and $f2$, e.g. between the values $f1 = 4.2$ mc. and $f2 = 4.4$ mc.

Figure 2:
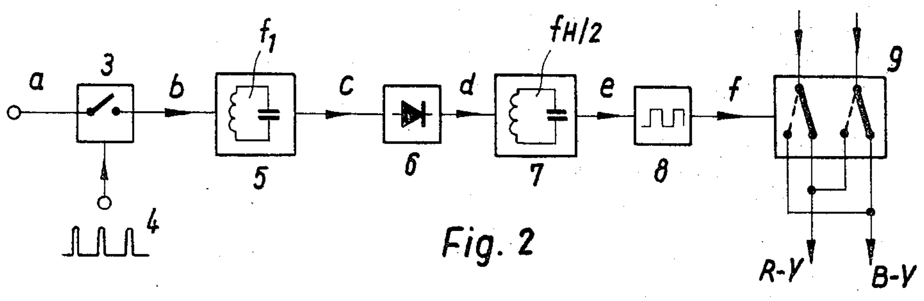
FIG. 2 is a block schematic of the invention.

According to FIG. 2 there is provided a gate 3 for deriving the bursts 2 from the FBAS color video signal according to FIG. 1*a*. Gate 3 is made permeable or opened by line frequency pulses 4 during the horizontal blanking period. The bursts 2 according to FIG. 1*b* are passed to a resonant circuit 5 which is tuned to the frequency $f1$. Accordingly, at the output of the resonant circuit 5 appear as shown in FIG. 1*c*, only the bursts 2 having the frequency $f1$, while the resonant circuit 5 suppresses the bursts 2 with the frequency $f2$. The bursts 2 according to FIG. 1*c* are rectified in a rectifier 6, whereby there is produced a voltage according to FIG. 1*d*. This voltage has a frequency of half the line frequency. The voltage according to FIG. 1*d* is passed to a resonant circuit 7, which is tuned to half the line frequency $fH/2$ and therefore furnishes a sine voltage according to FIG. 1*e* of half the line frequency. This sine voltage is used for synchronizing a multivibrator 8 which generates a rectangular voltage according to FIG. 1*f*, which switches in line frequency a line frequency switch 9. The moment of switching over lies here about in the middle of the horizontal synchronizing pulses 1. The switch 9 is, for instance, connected into the color signal path. It switches the direct and the delayed color signal path alternately line by line to two different color channels, so that for instance at one output of the switch 9 there appears continuously the signal R-Y and at another output continuously the signal B-Y. Since the resonant circuit 7 possesses high Q and therefore oscillates rigidly only at half the line frequency, great freedom from breakdown is arrived at. The resonant circuit 7 continues to oscillate correctly for many lines owing to the low attenuation, even if a few bursts 2 drop out or are distrubed.

Figure 3:
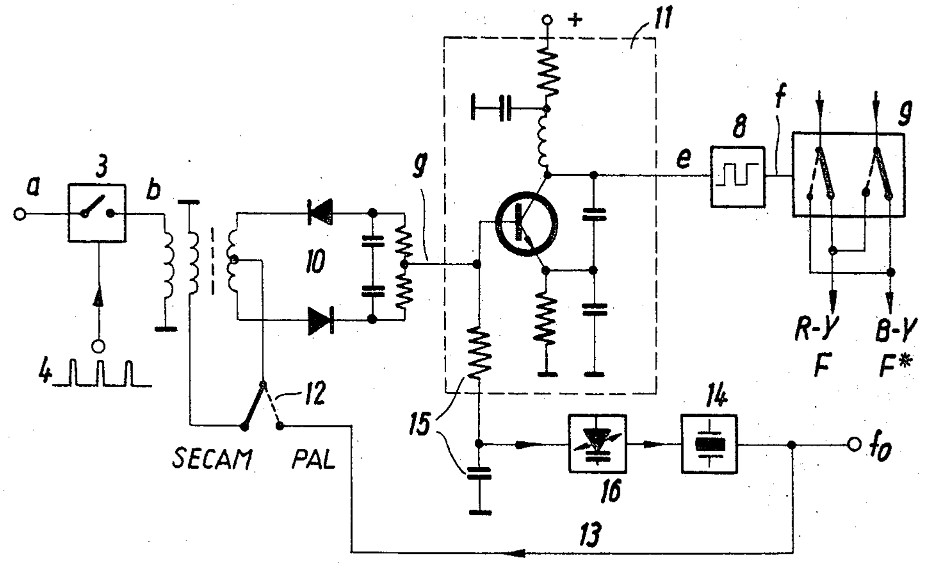
FIG. 3 is a modified schematic according to FIG. 1.

FIG. 3 shows a modified form of the circuit according to FIG. 2, which can moreover be switched over from SECAM to PAL operation and vice versa. First of all, SECAM operation is observed. The resonant circuit 5 and the rectifier 6 of FIG. 2 are replaced by a frequency discriminator 10 to which is passed the voltage according to FIG. 1*b*. The frequency discriminator 10 furnishes at its output a voltage according to FIG. 1*g*, whose pulses have a different polarity from line to line owing to the differing frequency of the bursts 2. The frequency of the pulse sequence according to FIG. 1 is again equal to half the line frequency. As resonant circuit 7 there is employed here an oscillator 11 tuned to half the line frequency which is synchronized by the voltage according to FIG. 1*g*. This again furnishes at its output a sine voltage of half the line frequency according to FIG. 1*e*, which in its turn synchronizes the multivibrator 8 oscillating with half the line frequency. This controls as in FIG. 1 with its output voltage according to FIG. 1*f* the line frequency switch 9.

In the event of switching to PAL operation with a switch 12, the frequency discriminator 10 is connected as a phase discriminator to which there is passed via a line 13 from a quartz oscillator 14 a reference carrier with constant frequency $f0$ and constant phase. In the phase discriminator 10 the color synchronizing signals of the PAL signal, which have phase differing from line to line by 90° are compared with the reference carrier of constant phase. At the output of the phase discriminator there is therefore once more a voltage according to FIG. 1*g*, which acts in the same way as in SECAM operation. With an RC network 15, whose time constant is very much greater than the duration of a line, the voltage according to FIG. 1*g* is smoothed and used via a reactance stage 16 for synchronizing the oscillator 14 to constant frequency and phase. The frequency discriminator 10, the oscillator 11, the multivibrator 8 and the switch 9 are therefore effective both with SECAM and with PAL operation. In the case of PAL operation the switch 9 can serve for making available in one path continuously the color carrier F and in a second path continuously the conjugate complex color carrier. F*, which are then further processed in the well known manner.

The circuit depending on frequency can also be a quartz filter, which from the frequency spectrum of the oscillation surges 2 filters out two oscillations offset in relation to one another by half the line frequency, from whose mixing product the voltage with half the line frequency is filtered out. The multivibrator 8 can in addition be synchronized by line frequency pulses, e.g. flyback pulses.

I claim:

1. In a color television receiver adapted to receive a color television signal of the SECAM III *b* type including two color signals alternately transmitted in line sequence by a color carrier frequency modulated by said color signals, the mean frequency of said carrier being changed from line to line between two different values, and said carrier being transmitted unmodulated with its mean frequency during the horizontal blanking periods, the improvement comprising: a gate means fed with said carrier and being conductive only during the horizontal blanking periods, a frequency dependent circuit means fed with the output of said gate means for producing an output voltage indicating the frequency of said carrier, filter means tuned to one half of the line frequency fed with the output of said frequency dependent circuit means, and a half line frequency operated SECAM switch means, the synchronizing input of said switch means being connected to the output of said filter means.

2. A color television receiver according to claim 1, wherein said frequency dependent circuit means includes a resonant circuit tuned to one of the two mean carrier frequencies.

3. A color television receiver according to claim 1, wherein said frequency dependent circuit means is a frequency discriminator.

4. A color television receiver according to claim 1 wherein said filter means is an oscillator oscillating with one half of the line frequency, said oscillator being synchronized by the output voltage of said frequency dependent circuit means.

5. In a color television receiver according to claim 3, a local reference carrier generator synchronized by received color synchronizing signals, and means for changing the frequency discriminator into a phase discriminator and feeding the reference carrier of constant phase and frequency to the phase discriminator (PAL/SECAM multistandard receiver).